United States Patent
Chen et al.

(10) Patent No.: US 12,464,261 B2
(45) Date of Patent: Nov. 4, 2025

(54) IMAGE PROCESSING APPARATUS AND METHOD HAVING LENS COLOR-SHADING CORRECTION MECHANISM

(71) Applicant: REALTEK SEMICONDUCTOR CORPORATION, Hsinchu (TW)

(72) Inventors: Sheng-Kai Chen, Hsinchu (TW); Hui-Chun Lien, Hsinchu (TW); Wen-Tsung Huang, Hsinchu (TW); Shih-Hsiang Yen, Hsinchu (TW); Szu-Po Huang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 341 days.

(21) Appl. No.: 18/224,309

(22) Filed: Jul. 20, 2023

(65) Prior Publication Data
US 2024/0073555 A1    Feb. 29, 2024

(30) Foreign Application Priority Data
Aug. 31, 2022    (TW) .................................. 111132937

(51) Int. Cl.
*G06T 7/80*    (2017.01)
*G06T 5/80*    (2024.01)
(Continued)

(52) U.S. Cl.
CPC .............. *H04N 25/611* (2023.01); *G06T 5/80* (2024.01); *G06T 7/80* (2017.01); *G06T 7/90* (2017.01);
(Continued)

(58) Field of Classification Search
CPC ........ H04N 25/611; H04N 25/61; G06T 5/80; G06T 7/80; G06T 7/90; G06T 2207/10024; G06V 10/56; G06V 10/758
(Continued)

(56) References Cited

U.S. PATENT DOCUMENTS

2006/0087702 A1*  4/2006  Satoh ................... H04N 23/843
                                                                358/461
2012/0249828 A1* 10/2012  Sun ...................... H04N 25/134
                                                                348/E9.051
(Continued)

FOREIGN PATENT DOCUMENTS

CN        107666562 A        2/2018
CN        110830778 A        2/2020

OTHER PUBLICATIONS

1) OA letter of a counterpart TW application (appl. no. 111132937) mailed on Feb. 17, 2023. 2) Summary of the TW OA letter in regard to the TW counterpart application: 1. Paragraphs [0041], [0045] and [0048] have editorial errors. 2. Claims 1 and 10 are rejected as allegedly being unpatentable in view of cited reference 1 (CN 107666562 A, also published as U.S. Pat. No. 20180033121A1) and cited reference 2 (CN 110830778 A).

*Primary Examiner* — Ali Bayat
(74) *Attorney, Agent, or Firm* — WPAT, PC (57) ABSTRACT

The present disclosure discloses an image processing apparatus having lens color-shading correction mechanism. A first and a second calibration circuits perform lens color-shading correction on an input image according to a first and a second calibration parameters to generate a first and a second calibrated images. A first and a second statistic circuits perform statistic on the first and the second calibrated images to generate a first and a second statistic results. A calibration operation circuit adjusts the second calibration parameters when the first calibrated image is determined to have a color-shading condition according to the first statistic result and when the second calibrated image is determined to not satisfy a color-shading criteria, and sets the second calibration parameters as the first calibration parameters when the second calibration parameters satisfies the color-shading criteria such that the first calibrated image (Continued)

generated by the first calibration circuit is outputted as an output calibrated image.

20 Claims, 7 Drawing Sheets

(51) Int. Cl.
*G06T 7/90* (2017.01)
*G06V 10/56* (2022.01)
*G06V 10/75* (2022.01)
*H04N 25/611* (2023.01)

(52) U.S. Cl.
CPC ............ *G06V 10/56* (2022.01); *G06V 10/758* (2022.01); *G06T 2207/10024* (2013.01)

(58) Field of Classification Search
USPC .......................................................... 382/167
See application file for complete search history.

(56) References Cited

U.S. PATENT DOCUMENTS

| | | | | |
|---|---|---|---|---|
| 2015/0249795 A1* | 9/2015 | Cho | .................. | H04N 25/61 |
| | | | | 348/251 |
| 2016/0021352 A1* | 1/2016 | Rudoy | .................. | H04N 23/88 |
| | | | | 348/223.1 |
| 2018/0033121 A1 | 2/2018 | Ida | | |
| 2019/0377166 A1* | 12/2019 | Komatsu | .............. | G02B 15/173 |
| 2020/0288072 A1* | 9/2020 | Seok | ................ | H04N 23/88 |
| 2022/0070417 A1* | 3/2022 | Pan | .................. | H04N 9/643 |
| 2025/0168522 A1* | 5/2025 | El-Yamany | ............ | H04N 23/12 |

\* cited by examiner

IMAGE PROCESSING APPARATUS AND METHOD HAVING LENS COLOR-SHADING CORRECTION MECHANISM

BACKGROUND OF THE INVENTION

1. Field of the Invention

The present disclosure relates to an image processing apparatus and an image processing method having lens color-shading correction mechanism.

2. Description of Related Art

In an image retrieving apparatus, color shading occurs to the image retrieving result due to various issues related to the disposition of lens and light-sensing elements, e.g., the effect of filters, the mismatch between chief ray angles of the lens and the light-sensing elements and the difference between refraction angles of the lens and the light-sensing elements. The color-shading condition further varies due to the variation of environment lights and angles of incidence of light. When an adjustment is made by the image processing mechanism according to different color-shading conditions, the output image varies accordingly. If a multiple of adjustments are made due to continuous variations of the environment, the user senses discontinuous visual experience due to the output image that keeps varying.

SUMMARY OF THE INVENTION

In consideration of the problem of the prior art, an object of the present disclosure is to provide an image processing apparatus and an image processing method having lens color-shading correction mechanism.

The present invention discloses an image processing apparatus having lens color-shading correction mechanism that includes a first calibration circuit, a second calibration circuit, a first statistic circuit, a second statistic circuit and a calibration operation circuit. The first calibration circuit is configured to perform lens color-shading correction on an input image according to first calibration parameters to generate a first calibrated image. The second calibration circuit is configured to perform lens color-shading correction on the input image according to second calibration parameters to generate a second calibrated image. The first statistic circuit is configured to perform color-shading parameter statistic on the first calibrated image to generate a first statistic result. The second statistic circuit is configured to perform color-shading parameter statistic on the second calibrated image to generate a second statistic result. The calibration operation circuit is configured to determine whether the second calibrated image satisfies a color-shading criteria according to the second statistic result when the first calibrated image is determined to have a color-shading condition according to the first statistic result. The calibration operation circuit controls the second calibration circuit to adjust the second calibration parameters when the second calibrated image is determined to not satisfy the color-shading criteria, and controls the first calibration circuit to set the second calibration parameters as the first calibration parameters when the second calibrated image satisfies the color-shading criteria such that the first calibrated image generated by the first calibration circuit is outputted as an output calibrated image.

The present invention also discloses an image processing method having lens color-shading correction mechanism used in an image processing apparatus that includes steps outlined below. Lens color-shading correction is performed on an input image according to first calibration parameters to generate a first calibrated image by a first calibration circuit. Lens color-shading correction is performed on the input image according to second calibration parameters to generate a second calibrated image by a second calibration circuit. Color-shading parameter statistic is performed on the first calibrated image to generate a first statistic result by a first statistic circuit. Color-shading parameter statistic is performed on the second calibrated image to generate a second statistic result by a second statistic circuit. Whether the second calibrated image satisfies a color-shading criteria is determined according to the second statistic result when the first calibrated image is determined to have a color-shading condition according to the first statistic result by a calibration operation circuit. The second calibration circuit is controlled to adjust the second calibration parameters by the calibration operation circuit when the second calibrated image is determined to not satisfy the color-shading criteria. The first calibration circuit is controlled to set the second calibration parameters as the first calibration parameters by the calibration operation circuit when the second calibrated image satisfies the color-shading criteria such that the first calibrated image generated by the first calibration circuit is outputted as an output calibrated image.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide an image processing apparatus and an image processing method having lens color-shading correction mechanism to allow the second calibration circuit to verify the adjustment of the calibration parameters when the first calibration circuit outputs the output calibrated image for display, so as to control the first calibration circuit to adjust the calibration parameters according to optimal calibration parameters verified by the second calibration circuit subsequently to generate the output calibrated image. The lens color-shading correction mechanism can be performed without affecting the output of the calibrated image.

Figure 1:
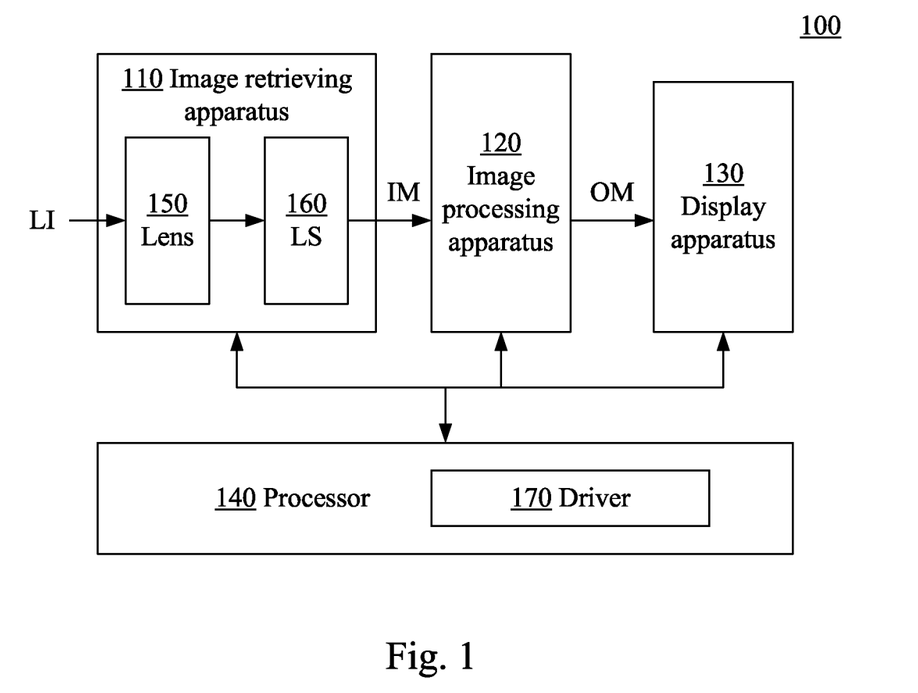
FIG. 1 illustrates a block diagram of a computer system according to an embodiment of the present invention.

Reference is now made to FIG. 1. FIG. 1 illustrates a block diagram of a computer system 100 according to an embodiment of the present invention. The computer system 100 can be any electronic apparatus that is able to perform image retrieving and displaying, such as but not limited to a smartphone, a tablet personal computer (PC), a notebook or a digital image-retrieving apparatus. The computer system 100 includes an image retrieving apparatus 110, an image processing apparatus 120, a display apparatus 130 and a processor 140.

The image retrieving apparatus 110 includes lens 150 and light-sensing elements 160 such that the light-sensing elements 160 (abbreviated as LS in FIG. 1) receive lights LI through the lens 150 to perform light sensing to generate an input image IM. The light-sensing elements 160 is easy to receive the lights with uneven angles of incidence due to the configuration of the lens 150 and the differences of light sources such that the color-shading condition occurs to the input image IM generated therefrom.

The image processing apparatus 120 having lens color-shading correction mechanism is configured to process the input image IM to eliminate the color-shading condition to further generate an output calibrated image OM to be displayed by the display apparatus 130. The processor 140 is electrically coupled to the image retrieving apparatus 110, the image processing apparatus 120 and the display apparatus 130 through a bus to control the operation thereof. The processor 140 is configured to execute a driver (e.g., software or firmware) 170 of the image processing apparatus 120 to control the image processing apparatus 120 to perform the lens color-shading correction mechanism described above.

Figure 2:
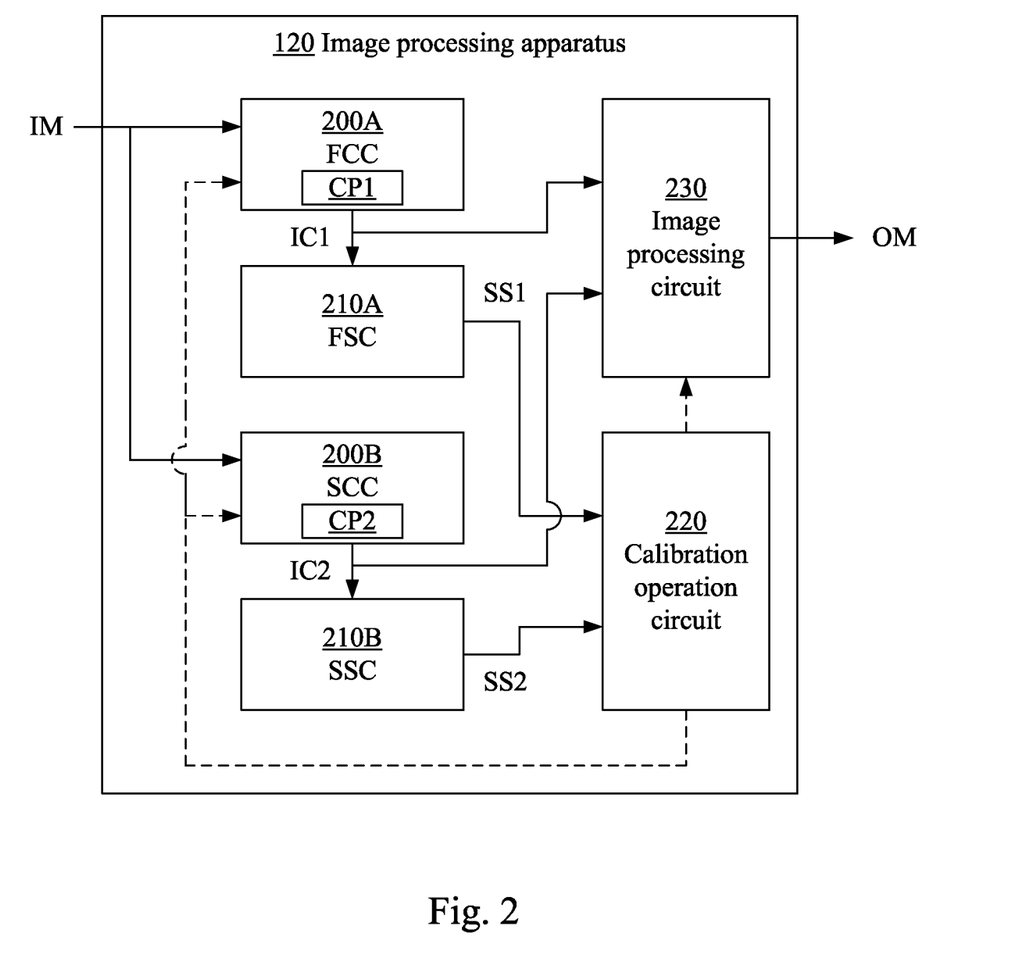
FIG. 2 illustrates a block diagram of the image processing apparatus having lens color-shading correction mechanism according to an embodiment of the present invention.

Reference is now made to FIG. 2. FIG. 2 illustrates a block diagram of the image processing apparatus 120 having lens color-shading correction mechanism according to an embodiment of the present invention. The image processing apparatus 120 includes a first calibration circuit 200A (abbreviated as FCC in FIG. 2), a second calibration circuit 200B (abbreviated as SCC in FIG. 2), a first statistic circuit 210A (abbreviated as FSC in FIG. 2), a second statistic circuit 210B (abbreviated as SSC in FIG. 2), a calibration operation circuit 220 and an image processing circuit 230.

The first calibration circuit 200A is configured to perform lens color-shading correction on the input image IM according to first calibration parameters CP1 to generate a first calibrated image IC1. The second calibration circuit 200B is configured to perform lens color-shading correction on the input image IM according to second calibration parameters CP2 to generate a second calibrated image IC2.

In an embodiment, each group of the first calibration parameters CP1 and the second calibration parameters CP2 include a group of color parameter bases and a group of color parameter adjustment ratios corresponding to various color parameters, wherein the color parameters include a red color parameter, a green color parameter and a blue color parameter.

In an embodiment, the color-shading condition usually appears as circles around a center of the input image IM. As a result, a group of color parameter bases typically include a plurality of groups of values each corresponding to one of the red color parameter, the green color parameter and the blue color parameter and include a plurality of bases corresponding to different locations ranging from a central area to a margin area of the input image IM.

In a numerical example, 28 areas are presented from the central area to the margin area. The values of the color parameter bases corresponding to the red color parameter from the central area, the first area, the third area, the sixth area and margin area are 1, 2.3, 3.2, 4.8 and 6.7. Similarly, each of the blue color parameter and green color parameter also includes a corresponding group of color parameter bases.

The color parameter adjustment ratios are a group of ratio values for the color parameters described above to multiply thereby. In a numerical example, the color parameter adjustment ratios include a group of values of 1.3, 0.95 and 0.98 corresponding to the red color parameter, the green color parameter and the blue color parameter respectively.

The first calibration circuit 200A multiplies the values of the pixels of the areas of the input image IM by the corresponding color parameter bases and the corresponding color parameter adjustment ratios. Take the red color parameter as an example, the first calibration circuit 200A multiplies the value of the red color parameter of each of the pixels of the central area, the first area, the third area, the sixth area and the margin area of the input image IM respectively by values of 1×1.3, 2.3×1.3, 3.2×1.3, 4.8×1.3 and 6.7×1.3 to generate the value of the red color parameter of each of the pixels of the first calibrated image IC1. The first calibration circuit 200A can process the green color parameter and the blue color parameter of each of the pixels of the input image IM by using the identical method to generate the values of the green color parameter and the blue color parameter of each of the pixels of the first calibrated image IC1.

The second calibration circuit 200B may use the method identical to that performed by the first calibration circuit 200A to process the input image IM according to the second calibration parameters CP2 to generate the second calibrated image IC2. The detail is not described herein. However, it is appreciated that in an embodiment, the color parameter bases included by the second calibration parameters CP2 and the first calibration parameters CP1 are kept to be the same. The color parameter adjustment ratios included by the second calibration parameters CP2 is set to be different from the color parameter adjustment ratios included by the first calibration parameters CP1.

The first statistic circuit 210A is configured to perform color-shading parameter statistic on the first calibrated image IC1 to generate a first statistic result SS1. The second statistic circuit 210B is configured to perform color-shading parameter statistic on the second calibrated image IC2 to generate a second statistic result SS2.

The first statistic circuit 210A and the second statistic circuit 210B respectively set the first calibrated image IC1 and the second calibrated image IC2 to be the image to be statisticized (the image to be performed statistic) to perform color-shading parameter statistic.

Figure 3:
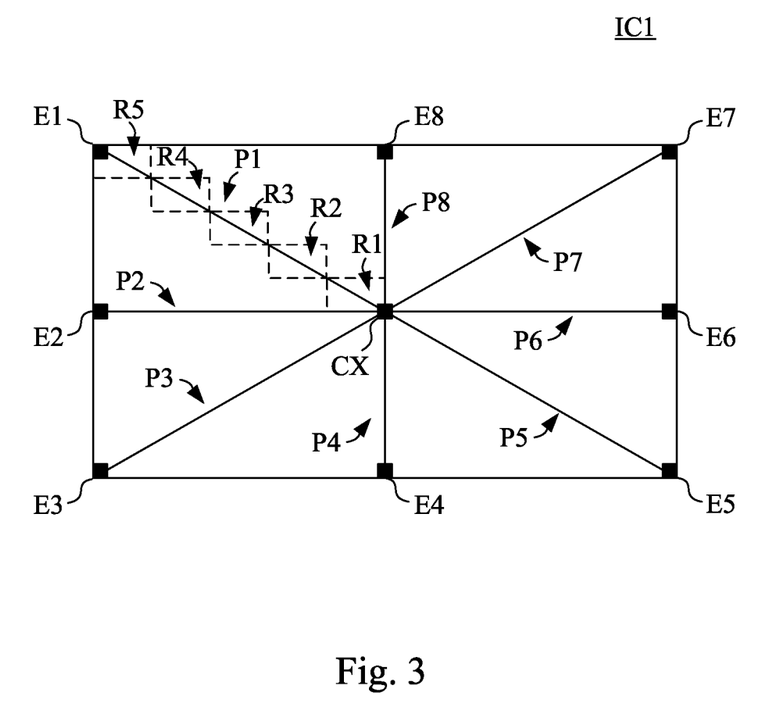
FIG. 3 illustrates a diagram of the first calibrated image that is set to be image to be statisticized according to an embodiment of the present invention.

Reference is now made to FIG. 3. FIG. 3 illustrates a diagram of the first calibrated image IC1 that is set to be image to be statisticized according to an embodiment of the present invention. The performance of the color-shading parameter statistic is described by using the calculation performed on the first calibrated image IC1 by the first statistic circuit 210A as an example in the following paragraphs.

The first statistic circuit 210A retrieves an optimal sampling path that has a most average color distribution from a plurality of sampling paths P1~P8 of the first calibrated image IC1. Each of the sampling path P1~P8 extends from one of image margin pixels E1~E8 to an image center pixel CX.

Take the sampling path P1 as an example, the first statistic circuit 210A calculates a plurality of color parameters of each of a plurality of sampling areas R1~R5 distributed in turn along the sampling path P1 and calculates color parameter ratios among the color parameters in each of the sampling areas R1~R5.

For example, the first statistic circuit 210A calculates the average values of the red color parameters, the green color parameters and the blue color parameters of all the pixels in the sampling area R1 and set the average values as the red color parameter, the green color parameter and the blue color parameter of the sampling area R1.

When the first calibrated image IC1 is determined to be a color image after a white balance operation is performed, the color parameter ratio is a red and green color parameter ratio, a blue and green color parameter ratio, a red and blue color parameter ratio, a brightness parameter ratio or a combination thereof. The brightness parameter ratio is a Y parameter of a YUV color space and can be generated, under the condition that the red color parameter, the green color parameter and the blue color parameter are R, G and B, by using such as but not limited to a formula of 0.299R+ 0.587G+0.114B.

When the first calibrated image IC1 is determined to be a grayscale image after the white balance operation is performed, the color parameter ratio is a red and green color parameter ratio, a blue and green color parameter ratio, a red and blue color parameter ratio and a saturation parameter ratio or a combination thereof. The saturation parameter ratio is an S parameter of a HSV color space and can be generated by using a predetermined formula according to the red color parameter, the green color parameter and the blue color parameter.

When the color parameter ratios of all the sampling areas R1~R5 are finished being calculated, the first statistic circuit 210A increments an accumulated value when a difference of the color parameter ratios between two neighboring sampling areas R1~R5 is smaller than a difference threshold value. In different embodiments, the first statistic circuit 210A may increment the accumulated value when the differences of all or part of the color parameter ratios are smaller than the difference threshold value.

More specifically, when the colors of the two neighboring sampling areas are close such that the color distribution is more average, the first statistic circuit 210A records such a condition by using the accumulated value. When more neighboring sampling areas have colors close to each other, the accumulated value is larger, in which the larger value stands for a more average color distribution of such a sampling path. The first statistic circuit 210A further retrieves one of the sampling paths P1~P8 having the largest accumulated value to be the optimal sampling path.

The first statistic circuit 210A calculates a color offset amount of the optimal sampling path as the first statistic result SS1. In an embodiment, for the optimal sampling path, the first statistic circuit 210A calculates a difference value between the color parameter ratio of a first area of the sampling areas closest to the image center pixel CX and the color parameter ratio of a second area closest to the image margin pixel E1 as the color offset amount.

For example, when the sampling path P1 is the optimal sampling path, the first statistic circuit 210A calculates the difference between the color parameter ratio of the sampling area R1 closest to the image center pixel CX and the color parameter ratio of the sampling area R5 closest to the image margin pixel E1 as the color offset amount.

In different embodiments, the first statistic circuit 210A may calculate the difference value of one or more than one color parameter ratios to generate one or more than one color offset amounts as the first statistic result SS1.

The second statistic circuit 210B can perform color-shading parameter statistic on the second calibrated image IC2 by using the method identical to that performed by the first statistic circuit 210A to generate the second statistic result SS2. The detail is not described herein.

The calibration operation circuit 220 is electrically coupled to the first statistic circuit 210A and the second statistic circuit 210B to receive the first statistic result SS1 and the second statistic result SS2 and perform calculation thereon. In an embodiment, the calibration operation circuit 220 executes software of firmware to perform the calculation. In an embodiment, the driver 170 of the image processing apparatus 120 executed by the processor 140 in FIG. 1 is configured to process a partial operation amount of the calibration operation circuit 220. The present invention is not limited to a specific calculation resource allocation method.

The calibration operation circuit 220 is further electrically coupled to the first calibration circuit 200A, the second calibration circuit 200B and the image processing circuit 230 to determine whether the lens color-shading correction is performed according to the calculation result and further control the operation of the first calibration circuit 200A, the second calibration circuit 200B and the image processing circuit 230.

The operation of the calibration operation circuit 220 is described in detail in the following paragraphs.

The calibration operation circuit 220 is configured to determine whether the first calibrated image IC1 has the color-shading condition according to the first statistic result SS1. More specifically, the calibration operation circuit 220 determines that the first calibrated image IC1 does not have the color-shading condition when the color offset amount serving as the first statistic result SS1 is not larger than an offset threshold value (e.g. a ratio of 2%). Further, the calibration operation circuit 220 determines that the first calibrated image IC1 has the color-shading condition when the color offset amount serving as the first statistic result SS1 is larger than the offset threshold value. The offset threshold value can be set to different values according to practical requirements so as to be used by the calibration operation circuit 220 to determine whether the color-shading condition exists.

In an embodiment, when a multiple of color offset amounts serving as the first statistic result SS1 are presented, the calibration operation circuit 220 may set a plurality of offset threshold values to perform determination. When each of at least a certain number of the color offset amounts is larger than the corresponding offset threshold value, the first calibrated image IC1 is determined to have the color-shading condition. The present invention is not limited thereto.

The calibration operation circuit 220 determines that the first calibrated image IC1 does not have the color-shading condition according to the first statistic result SS1 so as to directly output the first calibrated image IC1 generated by the first calibration circuit 200A as the output calibrated image OM.

The calibration operation circuit 220 determines whether the second calibrated image IC2 satisfies a color-shading criteria according to the second statistic result SS2 when the first calibrated image IC1 is determined to have the color-shading condition according to the first statistic result SS1.

In an embodiment, the calibration operation circuit 220 determines that the second calibrated image IC2 satisfies the color-shading criteria when the color offset amount generated by the second statistic circuit 210B is not larger than the offset threshold value. The calibration operation circuit 220 controls the first calibration circuit 200A to set the second calibration parameters CP2 as the first calibration parameters CP1 of the first calibration circuit 200A when the second calibrated image IC2 satisfies the color-shading criteria such that the first calibrated image IC1 generated by the first calibration circuit 200A is outputted as the output calibrated image OM.

On the other hand, the calibration operation circuit 220 determines that the second calibrated image IC2 does not satisfy the color-shading criteria when the color offset amount generated by the second statistic circuit 210B is larger than the offset threshold value. The calibration operation circuit 220 controls the second calibration circuit 200B to adjust the second calibration parameters CP2 when the second calibrated image IC2 is determined to not satisfy the color-shading criteria.

The adjustment mechanism performed by the second calibration parameters CP2 is described in detail in the following paragraphs.

When the calibration operation circuit 220 controls the second calibration circuit 200B to adjust the second calibration parameters CP2, the group of color parameter adjustment ratios are adjusted first, so as to determine whether the second calibrated image IC2 satisfies the color-shading criteria according to the second statistic result SS2 generated by the second statistic circuit 210B again. When the second calibrated image IC2 still does not satisfy the color-shading criteria, the color parameter adjustment ratios are further adjusted.

Once the second calibrated image IC2 is determined to satisfy the color-shading criteria, the calibration operation circuit 220 sets the group of color parameter adjustment ratios of the second calibration parameters CP2 as the group of color parameter adjustment ratios of the first calibration parameters CP1 such that the first calibrated image IC1 generated by the first calibration circuit 200A is outputted as the output calibrated image OM.

When the second calibrated image IC2 does not satisfy the color-shading criteria under the condition that the number of adjustment of color parameter adjustment ratios performed by the calibration operation circuit 220 reaches an adjustment threshold value, the adjustment of the color parameter adjustment ratios is determined to be not able to make the second calibrated image IC2 satisfy the color-shading criteria.

Under such a condition, the calibration operation circuit 220 controls the second calibration circuit 200B to replace the group of color parameter bases of the second calibration parameters CP2 by a new group of color parameter bases. Whether the second calibrated image IC2 satisfies the color-shading criteria is determined again according to the second statistic result SS2 generated by the second statistic circuit 210B. When the color-shading criteria is not satisfied, the group of color parameter bases are replaced by another group of color parameter bases.

Once the second calibrated image IC2 satisfies the color-shading criteria, the calibration operation circuit 220 sets the color parameter bases of the second calibration parameters CP2 as the color parameter bases of the first calibration parameters CP1 such that the first calibrated image IC1 generated by the first calibration circuit 200A is outputted as the output calibrated image OM.

Figure 4:
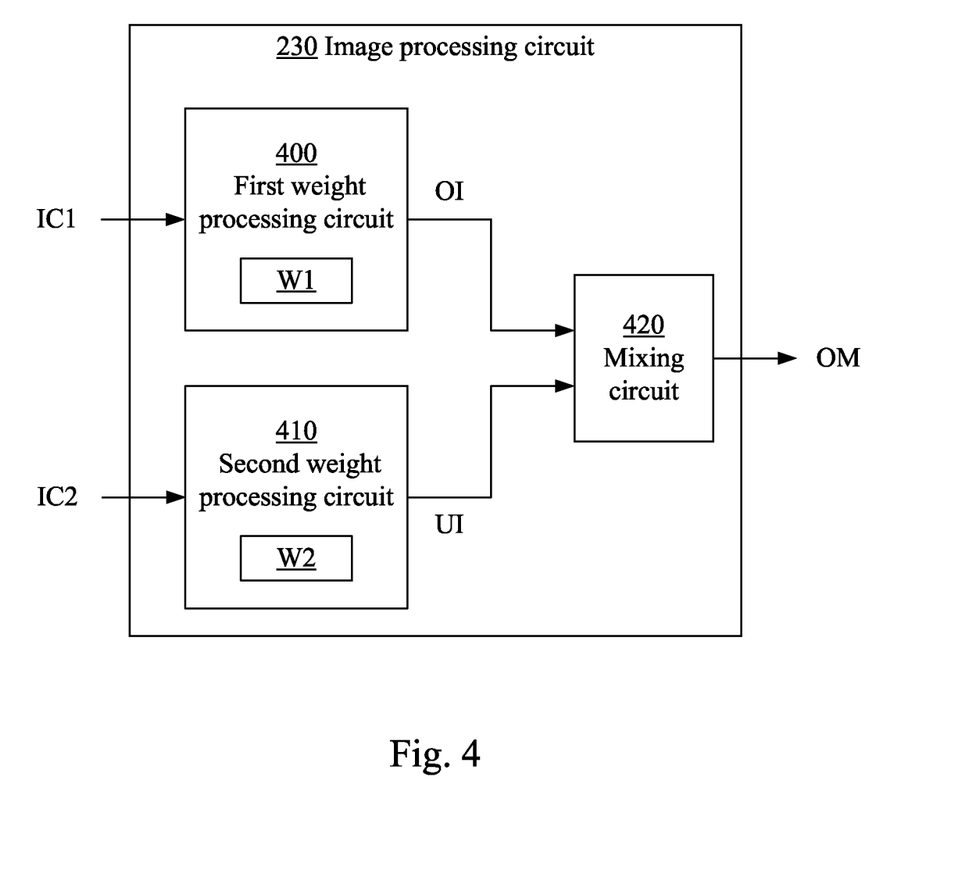
FIG. 4 illustrates a block diagram of the image processing circuit according to an embodiment of the present invention.

Reference is now made to FIG. 4. FIG. 4 illustrates a block diagram of the image processing circuit 230 according to an embodiment of the present invention. The image processing circuit 230 includes a first weight processing circuit 400, a second weight processing circuit 410 and a mixing circuit 420.

The first weight processing circuit 400 is configured to receive the first calibrated image IC1 and output an original image OI according to a first weight W1.

The second weight processing circuit 410 is configured to receive the second calibrated image IC2 and output an updated image UI according to a second weight W2.

The mixing circuit 420 is configured to mix the original image OI and the updated image UI to generate the output calibrated image OM.

When the color parameter bases included in the first calibration parameters CP1 are not replaced (i.e., the first calibration parameters CP1 are not adjusted or only the color parameter adjustment ratios in the first calibration parameters CP1 are adjusted), the image processing circuit 230 sets the first weight W1 to be a maximum value and sets the second weight W2 to be a minimum value. Under such a condition, the second weight processing circuit 410 is bypassed, which is equivalent to the condition that the image processing circuit 230 directly receives and outputs the first calibrated image IC1 as the output calibrated image OM.

On the other hand, since the output calibrated image OM varies a lot when the color parameter bases of the first calibration parameters CP1 are replaced, a visual experience of a user is greatly affected. As a result, the image processing circuit 230 gradually decreases the first weight W1 from the maximum value and gradually increases the second weight W2 from minimum value in a predetermined time interval before setting the group of color parameter bases of the second calibration parameters CP2 to be the group of color parameter bases of the first calibration parameters CP1, so as to set the group of color parameter bases of the second calibration parameters CP2 to be the group of color parameter bases of the first calibration parameters CP1, set the first weight W1 to be the maximum value and set the second weight W2 to be the minimum value when the predetermined time interval finishes.

As a result, in the predetermined time interval, the image processing apparatus 120 keeps receiving different frames of the input image IM and mixes the original image OI and the updated image UI with different color parameter bases to gradually switches to the new color parameter bases. When the predetermined time interval finishes, the setting of the new color parameter bases and the first weight W1 are equivalent to the condition that the image processing circuit 230 directly receives and outputs the first calibrated image IC1 as the output calibrated image OM. Such a method can avoid the discontinuous visual experience of the user.

Figure 5:
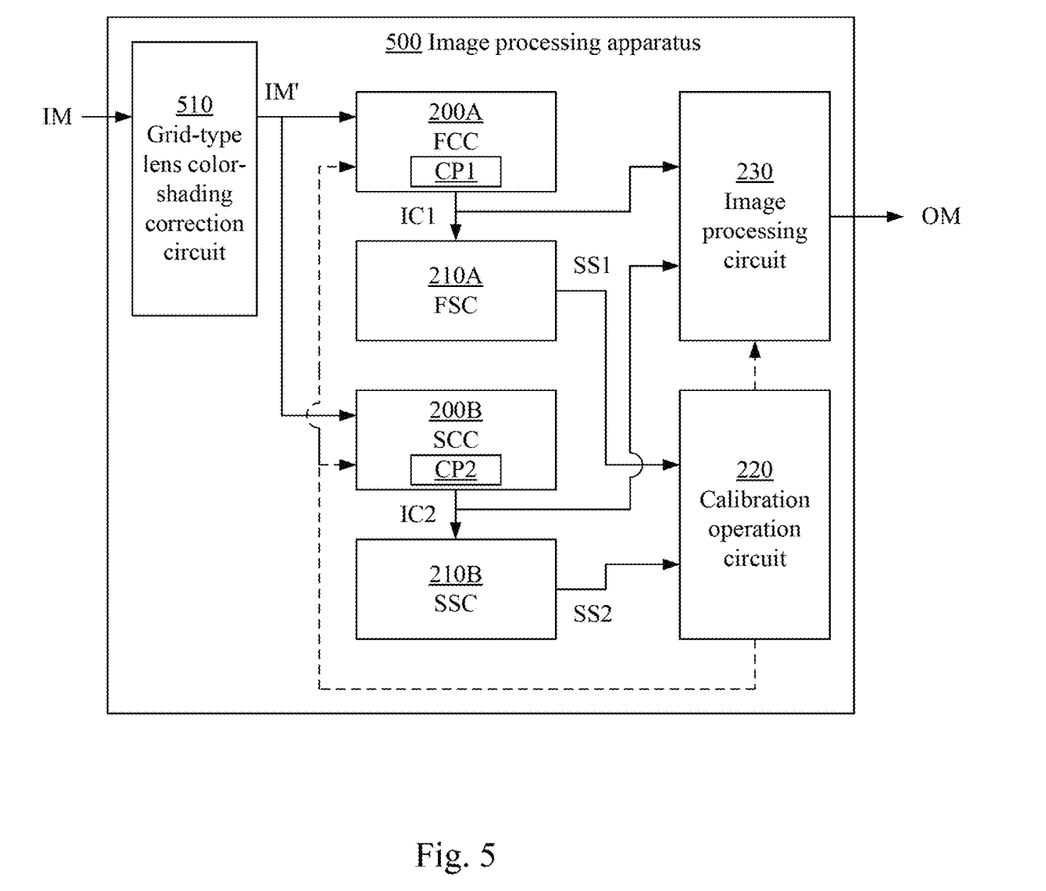
FIG. 5 illustrates a block diagram of the image processing apparatus according to another embodiment of the present invention.

Reference is now made to FIG. 5. FIG. 5 illustrates a block diagram of the image processing apparatus 500 according to another embodiment of the present invention. Similar to the image processing apparatus 120 in FIG. 2, the image processing apparatus 500 includes the first calibration circuit 200A, the second calibration circuit 200B, the first statistic circuit 210A, the second statistic circuit 210B, the calibration operation circuit 220 and the image processing circuit 230. However, in the present embodiment, the image processing apparatus 500 further includes a grid-type lens color-shading correction circuit 510.

The image processing apparatus 120 described above mainly deals with the circle-type lens color-shading condition in the image. However, in some usage scenarios, the lens 150 in FIG. 1 makes the retrieved input image IM has an image retrieving result that has more red color in the left side and more green color in the right side. Under such a condition, the input image IM not only has the circle-type of lens color-shading condition but also has a grid-type lens color-shading condition. As a result, the image processing apparatus 500 may use the grid-type lens color-shading correction circuit 510 to eliminate the grid-type lens color-shading condition of the input image IM in advance and feeds the processed input image IM' to the first calibration circuit 200A and the second calibration circuit 200B to perform circle-type lens color-shading condition correction.

The image processing apparatus having lens color-shading correction mechanism allows the second calibration circuit to verify the adjustment of the calibration parameters when the first calibration circuit outputs the output calibrated image for display, so as to control the first calibration circuit to adjust the calibration parameters according to optimal calibration parameters verified by the second calibration circuit subsequently to generate the output calibrated image. The lens color-shading correction mechanism can be performed without affecting the output of the calibrated image.

Figure 6A:
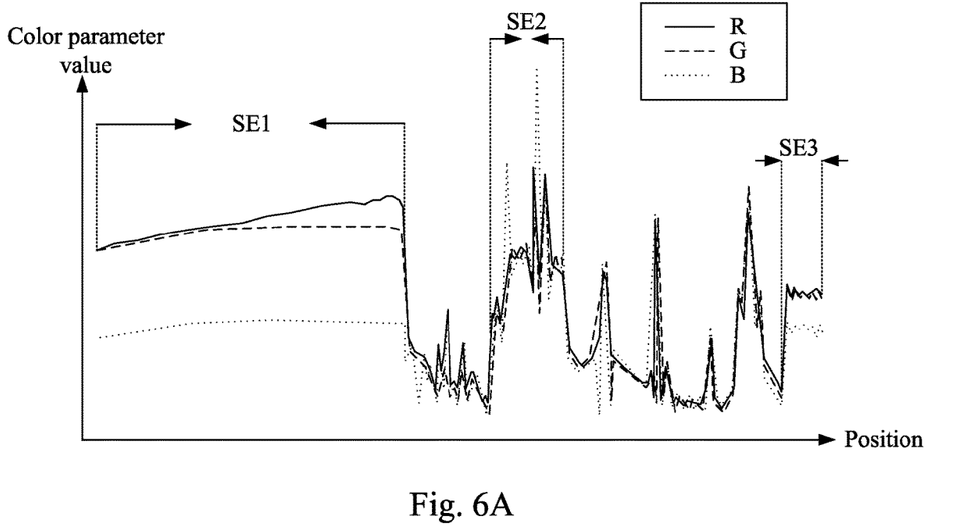
FIG. 6A illustrates a diagram of the color parameter distribution of an image before the lens color-shading correction is performed according to an embodiment of the present invention.
Figure 6B:
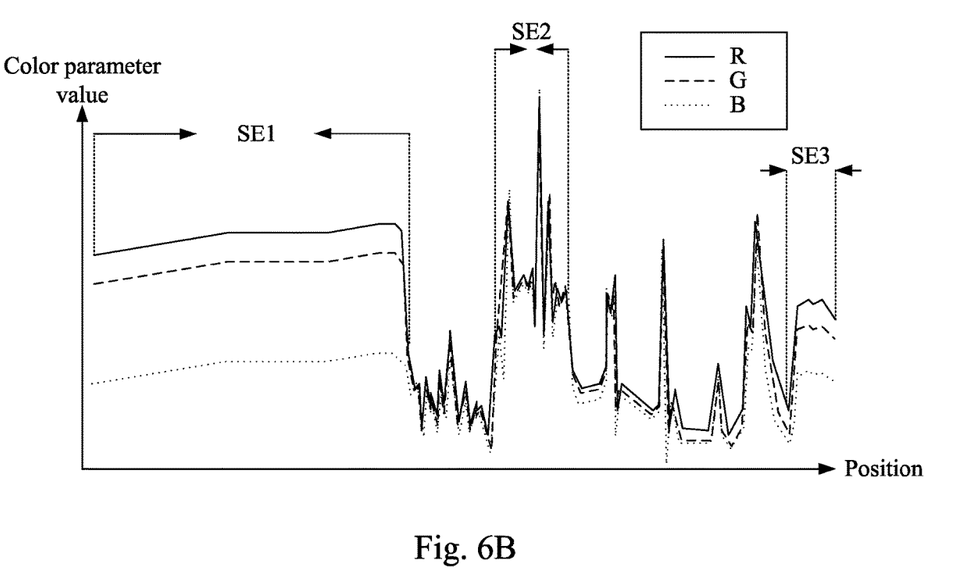
FIG. 6B illustrates a diagram of the color parameter distribution of an image after the lens color-shading correction is performed according to an embodiment of the present invention.

Reference is now made to FIG. 6A and FIG. 6B at the same time. FIG. 6A illustrates a diagram of the color parameter distribution of an image before the lens color-shading correction is performed (e.g. the input image IM) according to an embodiment of the present invention. FIG. 6B illustrates a diagram of the color parameter distribution of an image after the lens color-shading correction is performed (e.g. the first calibrated image IC1) according to an embodiment of the present invention.

In each of FIG. 6A and FIG. 6B, an X-axis stands for positions of a sampling path (e.g. the sampling path P1 in FIG. 3) and a Y-axis stands for the values of the color parameter, in which R stands for the distribution of the red color parameter, G stands for the distribution of the green color parameter and B stands for the distribution of the blue color parameter.

In comparison with FIG. 6A, the distribution of the color parameter in FIG. 6B having the lens color-shading correction performed shows that different positions of the sampling path have the same color parameter ratios among different color parameters. For example, for the corresponding sections SE1, SE2 and SE3 in FIG. 6A and FIG. 6B, the color parameter ratios in these sections in FIG. 6A are different due to the uneven color distribution, and the color parameter ratios in these sections in FIG. 6B are the same due to the even color distribution realized by using the lens color-shading correction. As a result, the lens color-shading condition can be eliminated.

Figure 7:
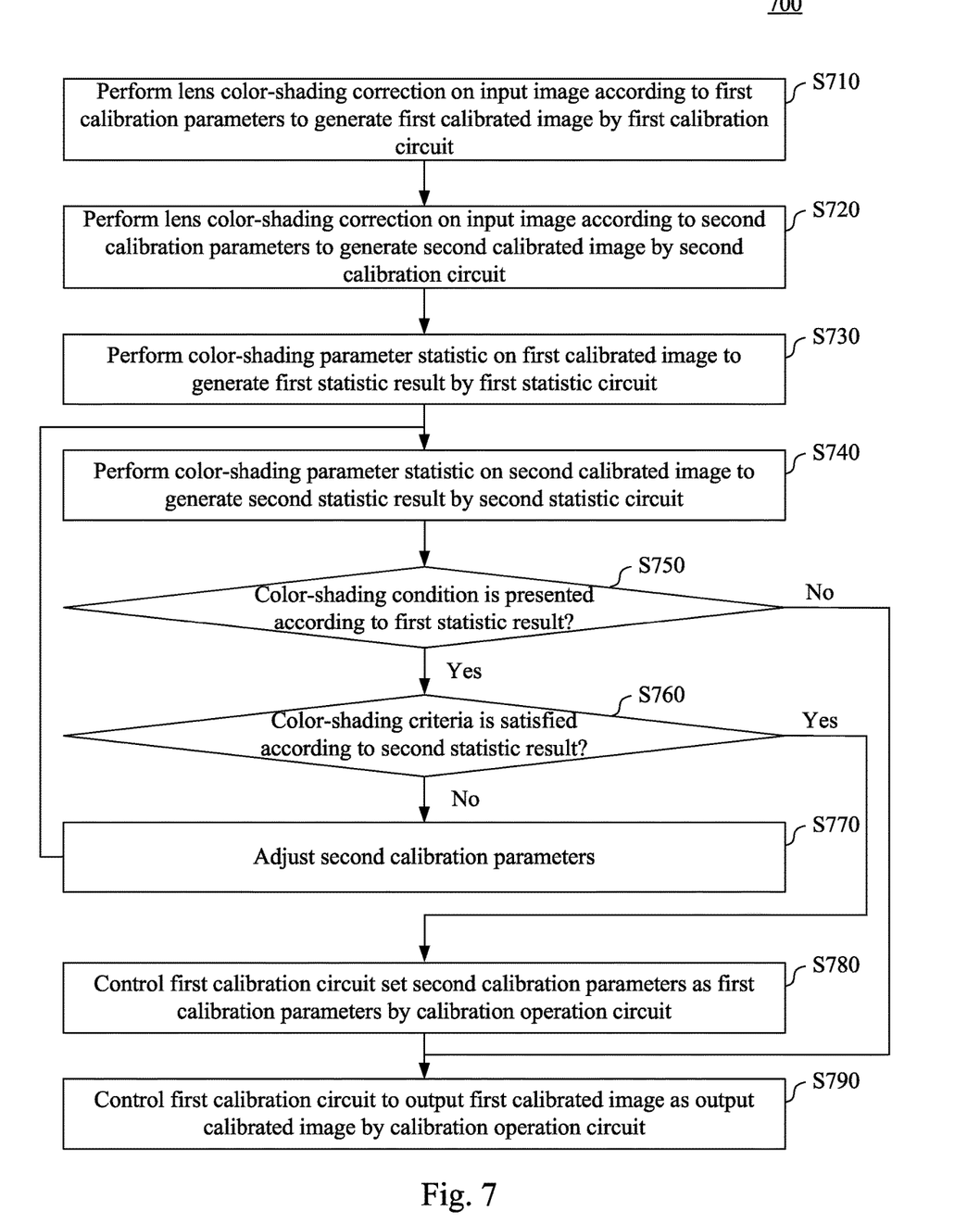
FIG. 7 illustrates a flow chart of an image processing method having lens color-shading correction mechanism according to an embodiment of the present invention.

Reference is now made to FIG. 7. FIG. 7 illustrates a flow chart of an image processing method 700 having lens color-shading correction mechanism according to an embodiment of the present invention.

Besides the apparatus described above, the present invention further discloses the image processing method 700 that can be used in such as, but not limited to the image processing apparatus 120 illustrated in FIG. 2. An embodiment of the image processing method 700 is illustrated in FIG. 7 and includes the steps outlined below.

In step S710, lens color-shading correction is performed on the input image IM according to the first calibration parameters CP1 to generate the first calibrated image IC1 by the first calibration circuit 200A.

In step S720, lens color-shading correction is performed on the input image IM according to the second calibration parameters CP2 to generate the second calibrated image IC2 by the second calibration circuit 200B.

In step S730, color-shading parameter statistic is performed on the first calibrated image IC1 to generate the first statistic result SS1 by the first statistic circuit 210A.

In step S740, color-shading parameter statistic is performed on the second calibrated image IC2 to generate the second statistic result SS2 by the second statistic circuit 210B.

In step S750, whether the first calibrated image IC1 has the color-shading condition is determined according to the first statistic result SS1.

In step S760, whether the second calibrated image IC2 satisfies a color-shading criteria is determined according to the second statistic result SS2 by the calibration operation circuit 220 when the first calibrated image IC1 is determined to have the color-shading condition according to the first statistic result SS1.

In step S770, the second calibration circuit 200B is controlled to adjust the second calibration parameters CP2 by the calibration operation circuit 220 when the second calibrated image IC2 is determined to not satisfy the color-shading criteria. The flow goes back to step S740 such that the second statistic circuit 210B performs color-shading parameter statistic on the second calibrated image IC2 again to generate the second statistic result SS2 to perform subsequent determination in step S750 and step S760.

In step S780, the first calibration circuit 200A is controlled to set the second calibration parameters CP2 as the first calibration parameters CP2 by the calibration operation circuit 220 when the second calibrated image IC2 satisfies the color-shading criteria.

In step S790, the first calibration circuit 200A is controlled to output the generated first calibrated image IC1 as the output calibrated image OM by the calibration operation circuit 220 when either the color-shading condition is determined to be not present in step S750 or after step S780 is finished.

It is appreciated that the embodiments described above are merely an example. In other embodiments, it is appreciated that many modifications and changes may be made by those of ordinary skill in the art without departing from the spirit of the invention.

In summary, the image processing apparatus and the image processing method having lens color-shading correction mechanism allow the second calibration circuit to verify the adjustment of the calibration parameters when the first calibration circuit outputs the output calibrated image for display, so as to control the first calibration circuit to adjust the calibration parameters according to optimal calibration parameters verified by the second calibration circuit subsequently to generate the output calibrated image. The lens color-shading correction mechanism can be performed without affecting the output of the calibrated image.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. An image processing apparatus having lens color-shading correction mechanism comprising:
    a first calibration circuit configured to perform lens color-shading correction on an input image according to first calibration parameters to generate a first calibrated image;
    a second calibration circuit configured to perform lens color-shading correction on the input image according to second calibration parameters to generate a second calibrated image;
    a first statistic circuit configured to perform color-shading parameter statistic on the first calibrated image to generate a first statistic result;
    a second statistic circuit configured to perform color-shading parameter statistic on the second calibrated image to generate a second statistic result; and
    a calibration operation circuit configured to determine whether the second calibrated image satisfies a color-shading criteria according to the second statistic result when the first calibrated image is determined to have a color-shading condition according to the first statistic result;
    wherein the calibration operation circuit controls the second calibration circuit to adjust the second calibration parameters when the second calibrated image is determined to not satisfy the color-shading criteria, and controls the first calibration circuit to set the second calibration parameters as the first calibration parameters when the second calibration parameters satisfy the color-shading criteria such that the first calibrated image generated by the first calibration circuit is outputted as an output calibrated image.

2. The image processing apparatus of claim 1, wherein the first statistic circuit and the second statistic circuit respectively set the first calibrated image and the second calibrated image to be an image to be statisticized to perform color-shading parameter statistic so as to retrieve a sampling path from the image to be statisticized;
    each of the first statistic circuit and the second statistic circuit calculates a color offset amount of the sampling path as the first statistic result and the second statistic result;
    the calibration operation circuit determines that the first calibrated image has the color-shading condition when the color offset amount is larger than a offset threshold value; and
    the calibration operation circuit determines that the second calibrated image satisfies the color-shading criteria when the color offset amount generated by the second statistic circuit is not larger than the offset threshold value.

3. The image processing apparatus of claim 2, wherein the sampling path is an optimal sampling path that has a most average color distribution among a plurality of candidate sampling paths retrieved from the image to be statisticized, wherein each of the candidate sampling paths extends from an image margin pixel to an image center pixel.

4. The image processing apparatus of claim 3, wherein each of the first statistic circuit and the second statistic circuit calculates a plurality of color parameters of each of a plurality of sampling areas distributed in turn along each of the candidate sampling paths of the image to be statisticized and calculates a color parameter ratio among the color parameters in each of the sampling areas, so as to increment an accumulated value when a difference of the color parameter ratios between two neighboring sampling areas is smaller than a difference threshold value, and further retrieve one of the candidate sampling paths having the largest accumulated value to be the optimal sampling path; and
    each of the first statistic circuit and the second statistic circuit calculates a difference value between the color parameter ratio of a first area of the sampling areas closest to the image center pixel and the color parameter ratio of a second area of the sampling areas closest to the image margin pixel as the color offset amount.

5. The image processing apparatus of claim 4, wherein the color parameters comprise a red color parameter, a green color parameter and a blue color parameter;
    when the image to be statisticized is determined to be a color image after a white balance operation is performed, the color parameter ratio is a red and green color parameter ratio, a blue and green color parameter ratio, a red and blue color parameter ratio, a brightness parameter ratio or a combination thereof; and
    when the image to be statisticized is determined to be a grayscale image after the white balance operation is performed, the color parameter ratio is the red and green color parameter ratio, the blue and green color parameter ratio, the red and blue color parameter ratio, a saturation parameter ratio or a combination thereof.

6. The image processing apparatus of claim 4, wherein the first calibration parameters and the second calibration parameters respectively comprise a group of color parameter bases and a group of color parameter adjustment ratios corresponding to the color parameters, wherein the group of color parameter bases of the first calibration parameters and the second calibration parameters are kept to be the same;
    when the calibration operation circuit controls the second calibration circuit to adjust the second calibration parameters, the group of color parameter adjustment ratios are adjusted first, so as to set the group of color parameter adjustment ratios of the second calibration parameters as the group of color parameter adjustment ratios of the first calibration parameters when the second calibrated image satisfies the color-shading criteria;
    when the second calibrated image does not satisfy the color-shading criteria by adjusting the group of color parameter adjustment ratios, the calibration operation circuit controls the second calibration circuit to replace the group of color parameter bases of the second calibration parameters so as to set the group of color parameter bases of the second calibration parameters as the group of color parameter bases of the first calibration parameters when the second calibrated image satisfies the color-shading criteria.

7. The image processing apparatus of claim 6, further comprising an image processing circuit comprising;
    a first weight processing circuit configured to receive the first calibrated image and output an original image according to a first weight;
    a second weight processing circuit configured to receive the second calibrated image and output an updated image according to a second weight; and
    a mixing circuit configured to mix the original image and the updated image to generate the output calibrated image;
    wherein the image processing circuit sets the first weight to be a maximum value and sets the second weight to be a minimum value when the group of color parameter bases comprised by the first calibration parameters are not replaced;

the image processing circuit gradually decreases the first weight from the maximum value and gradually increases the second weight from minimum value in a predetermined time interval before setting the group of color parameter bases of the second calibration parameters to be the group of color parameter bases of the first calibration parameters, so as to set the group of color parameter bases of the second calibration parameters to be the group of color parameter bases of the first calibration parameters, set the first weight to be the maximum value and set the second weight to be the minimum value when the predetermined time interval finishes.

8. The image processing apparatus of claim 1, further comprising a grid-type lens color-shading correction circuit configured to perform grid-type lens color-shading calibration on the input image and feed the calibrated input image to the first calibration circuit and the second calibration circuit subsequently.

9. The image processing apparatus of claim 1, wherein the image processing apparatus is disposed in a computer system, and a processor of the computer system is configured to execute a driver of the image processing apparatus configured to process a partial operation amount of the calibration operation circuit.

10. The image processing apparatus of claim 1, wherein the calibration operation circuit determines that the first calibrated image does not have the color-shading condition according to the first statistic result so as to directly output the first calibrated image generated by the first calibration circuit as the output calibrated image.

11. An image processing method having lens color-shading correction mechanism used in an image processing apparatus comprising:
performing lens color-shading correction on an input image according to first calibration parameters to generate a first calibrated image by a first calibration circuit;
performing lens color-shading correction on the input image according to second calibration parameters to generate a second calibrated image by a second calibration circuit;
performing color-shading parameter statistic on the first calibrated image to generate a first statistic result by a first statistic circuit;
performing color-shading parameter statistic on the second calibrated image to generate a second statistic result by a second statistic circuit; and
determining whether the second calibrated image satisfies a color-shading criteria according to the second statistic result when the first calibrated image is determined to have a color-shading condition according to the first statistic result by a calibration operation circuit;
controlling the second calibration circuit to adjust the second calibration parameters by the calibration operation circuit when the second calibrated image is determined to not satisfy the color-shading criteria; and
controlling the first calibration circuit to set the second calibration parameters as the first calibration parameters by the calibration operation circuit when the second calibration parameters satisfy the color-shading criteria such that the first calibrated image generated by the first calibration circuit is outputted as an output calibrated image.

12. The image processing method of claim 11, further comprising:
respectively setting the first calibrated image and the second calibrated image to be an image to be statisticized to perform color-shading parameter statistic so as to retrieve a sampling path from the image to be statisticized by each of the first statistic circuit and the second statistic circuit;
calculating a color offset amount of the sampling path as the first statistic result and the second statistic result by each of the first statistic circuit and the second statistic circuit;
determining that the first calibrated image has the color-shading condition by the calibration operation circuit when the color offset amount is larger than a offset threshold value; and
determining that the second calibrated image satisfies the color-shading criteria by the calibration operation circuit when the color offset amount generated by the second statistic circuit is not larger than the offset threshold value.

13. The image processing method of claim 12, wherein the sampling path is an optimal sampling path that has a most average color distribution among a plurality of candidate sampling paths retrieved from the image to be statisticized, wherein each of the candidate sampling paths extends from an image margin pixel to an image center pixel.

14. The image processing method of claim 13, further comprising:
calculating a plurality of color parameters of each of a plurality of sampling areas distributed in turn along each of the candidate sampling paths of the image to be statisticized and calculating a color parameter ratio among the color parameters in each of the sampling areas by each of the first statistic circuit and the second statistic circuit, so as to increment an accumulated value when a difference of the color parameter ratios between two neighboring sampling areas is smaller than a difference threshold value, and further retrieve one of the candidate sampling paths having the largest accumulated value to be the optimal sampling path; and
calculating a difference value between the color parameter ratio of a first area of the sampling areas closest to the image center pixel and the color parameter ratio of a second area of the sampling areas closest to the image margin pixel as the color offset amount by each of the first statistic circuit and the second statistic circuit.

15. The image processing method of claim 14, wherein the color parameters comprise a red color parameter, a green color parameter and a blue color parameter;
when the image to be statisticized is determined to be a color image after a white balance operation is performed, the color parameter ratio is a red and green color parameter ratio, a blue and green color parameter ratio, a red and blue color parameter ratio, a brightness parameter ratio or a combination thereof; and
when the image to be statisticized is determined to be a grayscale image after the white balance operation is performed, the color parameter ratio is the red and green color parameter ratio, the blue and green color parameter ratio, the red and blue color parameter ratio, a saturation parameter ratio or a combination thereof.

16. The image processing method of claim 14, wherein the first calibration parameters and the second calibration parameters respectively comprise a group of color parameter bases and a group of color parameter adjustment ratios corresponding to the color parameters, wherein the group of color parameter bases of the first calibration parameters and the second calibration parameters are kept to be the same, the image processing method further comprising:

when the calibration operation circuit controls the second calibration circuit to adjust the second calibration parameters, adjusting the group of color parameter adjustment ratios first, so as to set the group of color parameter adjustment ratios of the second calibration parameters as the group of color parameter adjustment ratios of the first second calibration parameters when the second calibrated image satisfies the color-shading criteria; and when the second calibrated image does not satisfy the color-shading criteria by adjusting the group of color parameter adjustment ratios, controlling the second calibration circuit by the calibration operation circuit to replace the group of color parameter bases of the second calibration parameters so as to set the group of color parameter bases of the second calibration parameters as the group of color parameter bases of the first calibration parameters when the second calibrated image satisfies the color-shading criteria.

17. The image processing method of claim 16, further comprising:

receiving the first calibrated image and outputting an original image according to a first weight by a first weight processing circuit of an image processing circuit;

receiving the second calibrated image and outputting an updated image according to a second weight by a second weight processing circuit of the image processing circuit; and mixing the original image and the updated image to generate the output calibrated image by a mixing circuit of the image processing circuit;

setting the first weight to be a maximum value and setting the second weight to be a minimum value by the image processing circuit when the group of color parameter bases comprised by the first calibration parameters are not replaced;

gradually decreasing the first weight from the maximum value and gradually increasing the second weight from minimum value in a predetermined time interval by the image processing circuit before setting the group of color parameter bases of the second calibration parameters to be the group of color parameter bases of the first calibration parameters;

setting the group of color parameter bases of the second calibration parameters to be the group of color parameter bases of the first calibration parameters, setting the first weight to be the maximum value and setting the second weight to be the minimum value when the predetermined time interval finishes.

18. The image processing method of claim 11, further comprising:

performing grid-type lens color-shading calibration on the input image and feeding the calibrated input image to the first calibration circuit and the second calibration circuit subsequently by a grid-type lens color-shading correction circuit.

19. The image processing method of claim 11, wherein the image processing apparatus is disposed in a computer system, and a processor of the computer system is configured to execute a driver of the image processing apparatus configured to process a partial operation amount of the calibration operation circuit.

20. The image processing method of claim 11, wherein the calibration operation circuit determines that the first calibrated image does not have the color-shading condition according to the first statistic result so as to directly output the first calibrated image generated by the first calibration circuit as the output calibrated image.

* * * * *